United States Patent [19]
Budinger et al.

[11] 3,760,637
[45] Sept. 25, 1973

[54] NIP PRESSURE MEASUREMENT

[75] Inventors: William D. Budinger, Chadds Ford, Pa.; Paul F. McLaughlin, Wilmington, Del.

[73] Assignee: Rodel, Inc., Wilmington, Del.

[22] Filed: Feb. 26, 1971

[21] Appl. No.: 119,295

[52] U.S. Cl. ............................... 73/141 R, 73/37
[51] Int. Cl. ............................................. G01l 5/00
[58] Field of Search ................. 73/141 R, 141 A, 73/37, 37.5, 37.6, 37.8, 37.9; 177/208; 33/182, DIG. 2

[56] References Cited
UNITED STATES PATENTS

| | | | |
|---|---|---|---|
| 2,465,628 | 3/1949 | Border | 73/388 R X |
| 2,592,569 | 4/1952 | Henderson | 73/37.5 UX |
| 2,640,977 | 6/1953 | Parisi | 73/37.5 UX |
| 2,954,221 | 9/1960 | Ernst | 177/208 |
| 2,695,518 | 11/1954 | Huck | 73/141 A |
| 3,396,577 | 8/1968 | Brackett | 73/141 R |
| 3,418,850 | 12/1968 | Goddin | 73/141 A |
| 2,950,620 | 8/1960 | Magill | 73/88 R |

Primary Examiner—Charles A. Ruehl
Attorney—Connolly & Hutz

[57] ABSTRACT

Nip pressures such as between two rolls are measured by inserting into the nip a thin-walled non-rigid tube, passing a restricted stream of pressurized fluid through a conduit to which the tube is connected to cause the fluid to move through the tube, and measuring the pressure of the fluid in the tube when it is balanced by the nip pressure. The restriction can restrict the rate of flow or the volume of flow.

22 Claims, 3 Drawing Figures

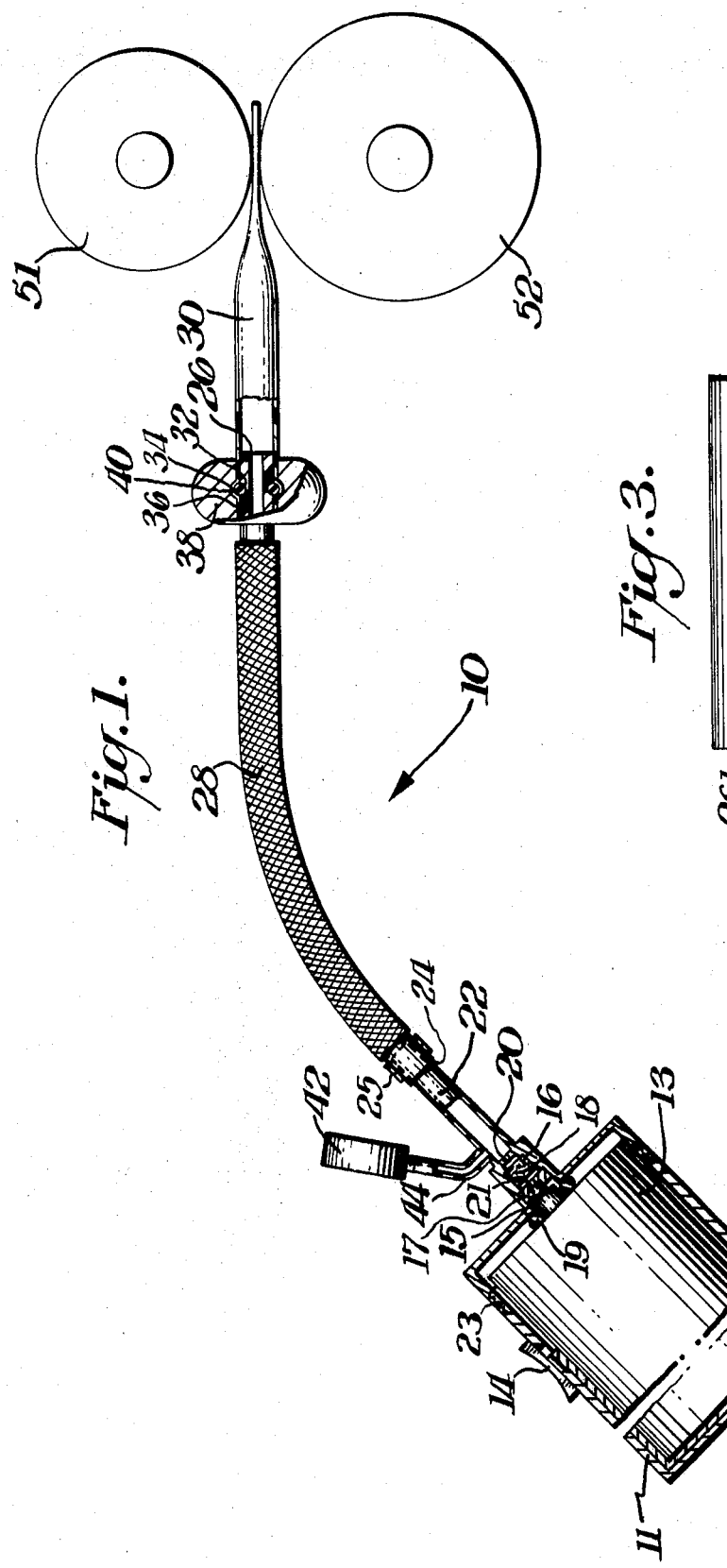
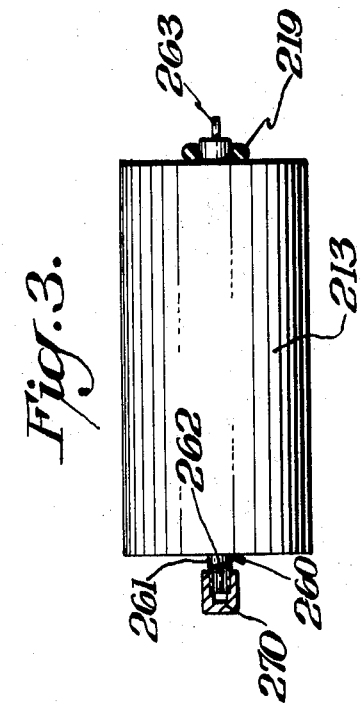

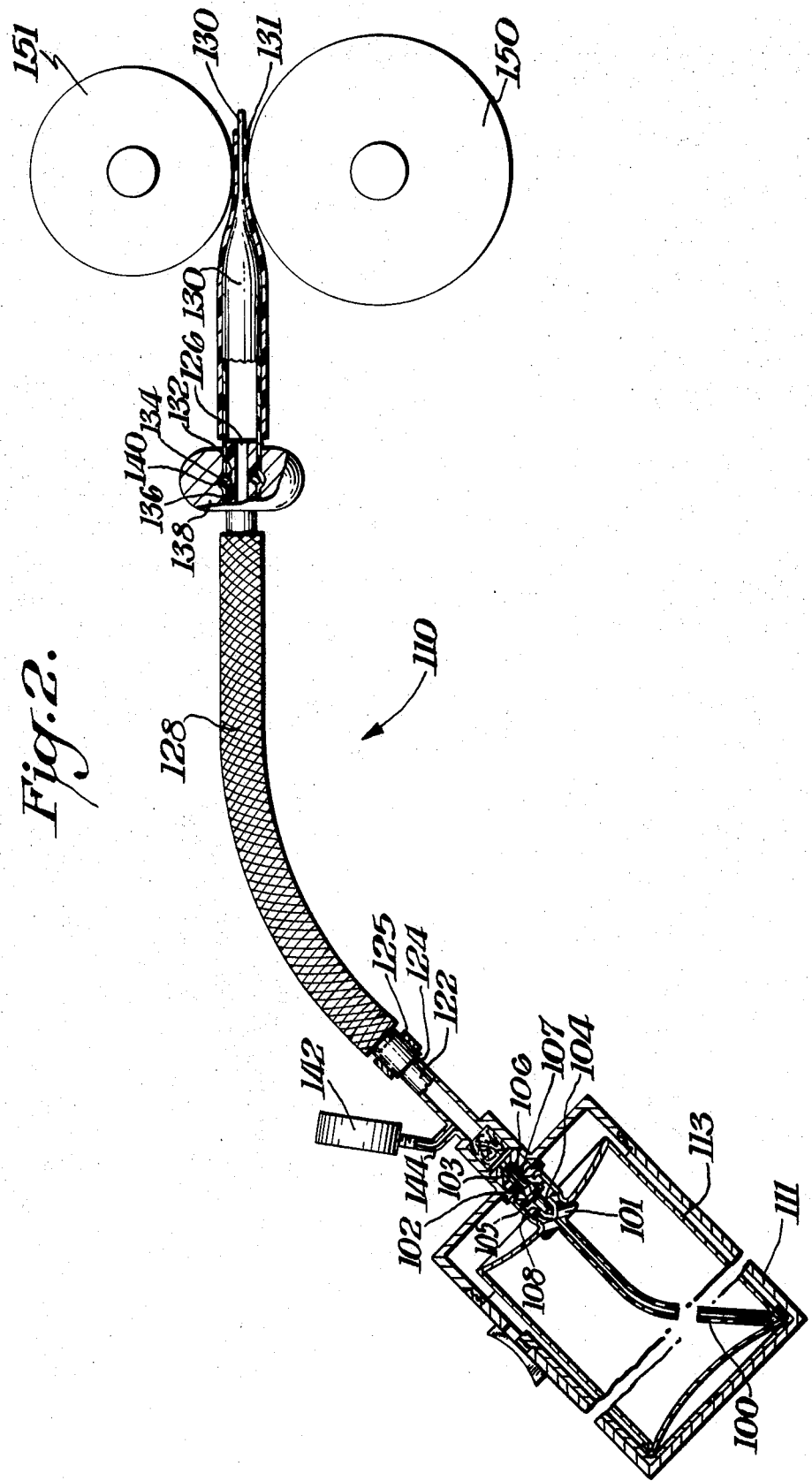

NIP PRESSURE MEASUREMENT

The present invention relates to the measurement of nip pressures such as the pressure between the inking rolls in the inking train of a printing press.

Among the objects of the present invention is the provision of simple methods and apparatus for measuring nip pressures. The foregoing as well as additional objects of the present invention will be more readily understood from the following description of several exemplifications, reference being made to the accompanying drawings in which:

FIG. 1 shows in side view partly sectioned and partly broken away, one arrangement for effecting nip pressure measurement pursuant to the present invention;

FIG. 2 is a similar view showing a modified arrangement in accordance with the present invention; and FIG. 3 is a side view partly in section of a further modified fluid source representative of the present invention.

When a roll is pressed against a cooperating surface such as that of another roll or even of a flat backing member, the exact pressures in the nip between the roll and its cooperating member has not been readily determinable. The force by which the roll is pressed against its cooperating member can be accurately controlled so that the force per axial length of roll is readily provided. However at the nip the area over which the roll applies pressure depends upon the character of the material present there, being greatest along the line of the nip and decreasing on either side. The computation of the maximum force per unit of such area is very complex and not practical.

According to the present invention the pressure at the nip of a roll is measured by inserting a thin-walled non-rigid tube in the nip, passing a restricted flow of pressurized fluid through a conduit to which the tube is connected to cause the fluid to move through the tube in the nip, and measuring the pressure in the tube when it is balanced by the nip pressure. The restriction to the fluid flow can be either with respect to rate of flow or volume of flow.

The fluid is desirably a refrigerant gas which can be conveniently stored under pressure as a liquid in a relatively small sized container that can easily be held in the hand along with the pressure gauge and conduit. For nips in which there is a clearance larger than twice the wall thickness of the non-rigid tube, the volume of fluid required to flow in order to make a measurement can be reduced by using a filler to take up the excess clearance, or by plugging the non-rigid tube with a resiliently compressible fluid-transmitting porous plug and conducting the pressure measurement with the porous plug squeezed at the nip.

It is also very helpful to have the conduit include a readily bendable bend-retaining section that enables manipulation of the testing device so that it can be more readily reached into awkward places.

It is particularly helpful to have the non-rigid tube removably connected to the balance of the conduit using a pressure-withstanding connection. One very good and extremely effective connection of this type includes an O-ring groove encircling a portion of the conduit, an O-ring in the groove and projecting therefrom, the tube being fitted over the O-ring, and a locking ring encircling the tube over the O-ring and having an internal groove that receives the tube-covered outer portion of the O-ring and seals the connection.

A feature of the present invention is the provision of a bulbous nose on the conduit to keep it from being drawn into the nip of rolls as the rolls rotate. The locking ring can have such a bulbous shape preferably with a resinous surface and particularly with such a surface having the low-friction characteristics of polyethylene or more slippery resins such as polytetrafluoroethylene.

Referring now to the drawings, FIG. 1 shows a measuring device 10 that has a container portion 11 in which is housed a pressurized fluid such as a can 13 of "Refrigerant 12." A button 14 projects from the side of the container and is arranged so that when pushed forward the button causes the can 13 to push its valved discharge spout 15 against an actuator block 17, causing the spout to be forced toward the can, thus releasing the refrigerant under pressure. A gasket 19 around the mouth of the can keeps the released refrigerant from escaping in any direction other than through an exit port 21 in the block 17.

Downstream of the exit port, the container opens into a chamber 16 large enough to permit vaporization of any of the fluid that escapes in liquid form, and the chamber can be filled with porous material such as packing 18, to help assure that any liquid vaporizes before it is discharged at the downstream end of the chamber. At that downstream end of the chamber there is a restrictive orifice 20 which limits the rate of flow of the fluid, and discharges into a fitting 22 to which is secured a flexible hose 24 as by a clamp 25. The hose can have a pressure-resistant relatively thick-walled plastic liner the downstream end of which is shown at 26, over which is fitted a shape-retaining yieldable sheath 28 of braided wire, although a length of flexible spiral metal conduit, such as is used in goosenecks of electric light fixtures, will also satisfactorily hold hose 24.

To the hose end 26 there is connected a thin-walled non-rigid tube 30, one end of which is shown as locked on to hose 24 by means of an O-ring connector. Encircling the hose end 26 is an O-ring groove 32 in which an O-ring 34 is fitted and from which it projects. Over the projecting portion of the O-ring the end 37 of thin-walled tube 30 is slid and then a locking ring 38 having an internal O-ring groove 40 is snapped over the assembly by pushing the locking ring along the length of the tube 30 and then forcing the locking ring over the O-ring 34 until the O-ring snaps into groove 40.

A pressure gauge 42 is mounted on a branch 44 of fitting 22 so that the gauge measures the pressure between the downstream end of orifice 20 and the nip of rolls 51, 52 for example, between which the outer end of tube 30 is slipped.

In FIG. 1 the device 10 is shown in pressure-measuring position. It is only necessary to push button 14 forward and to watch the dial of pressure gauge 42. The dial will gradually move to increasing pressures and then stop moving when the pressure gets high enough to cause some of the fluid to escape through the nip and out the outer end of tube 30. The maximum pressure indicated on the gauge is the nip pressure. Button 14 can then be retracted, the unit withdrawn from the nip and inserted into another nip or at a different location between the rolls 51 and 52, and another measurement carried out.

If too much fluid is discharged during a measurement, the fluid flow can affect the pressures downstream of the orifice, and will generally cause the pressure reading to be too high. However when the button is then retracted the flow of fluid will stop and the pressure on the gauge 42 will drop to the pressure at the nip and stay there until the unit is removed from the nip. This provides a simple check on the reading.

Orifice 20 is made so restrictive that it limits the flow of the pressurized fluid more than the nip does. For general use to measure the pressures between nips in a printing press inking train or moistening train, an orifice of cylindrical shape having a 3 to 5 mil diameter and an axial length of 0.020 to 0.050 inch, is quite suitable for use with "Refrigerant 12," permitting measurements to be made in about 1 to 2 seconds and with so little flow of fluid that a 3 ounce supply can be used for hundreds of measurements. Making the orifice more restrictive delays the build-up of pressure in the measuring conduit and this increases the time needed to make the measurement. Making the orifice less restrictive shortens the measuring time but also causes greater loss of fluid per measurement. Making the orifice path long also has some effect in increasing the flow restriction, and conversely shortening it reduces the restriction.

To guard against pluggage of the orifice a loose wire can be mounted in it and secured with its ends projecting from opposite ends of the orifice and bent over to keep the wire from escaping. However the wire can slide somewhat up and down the orifice and thus help keep foreign material from building up in it. The wire can for example be a 3-mil diameter wire and can be fitted in an orifice 5 to 7 mils in diameter.

The porous material 18 when inserted in the vaporizing chamber 16, can by way of example merely be a plug of open-celled polyethylene foam slightly oversize in width, and pushed into the chamber.

Thin-walled non-rigid tube 30 is conveniently made of seamless polyethylene tubing and very good measurements are provided by such tubing having a 1 inch width when folded flat. The wall thickness of this tubing is preferably 1 to 3 mils. Smaller widths such as one-half or one-fourth inch can be used, particularly where the nip pressure is to be measured over a more localized region. On the other hand larger widths up to 2 inches or more can be used.

"Refrigerant 12" develops pressure of approximately 70 pounds per square inch at room temperature and can be used for nip pressures almost as high. In general the nip pressures of inking and water-form rolls in a printing press vary from about 1 to about 15 pounds per square inch so that for such use the pressure gauge 42 can be correspondingly calibrated. Other fluids can be used, such as "Refrigerant 22" which develops a substantially higher pressure than "Refrigerant 12." Carbon-dioxide or compressed gases such as air or nitrogen, can also be used. Liquefied gases are preferred since large quantities can be stored in small places. Thus a 3 ounce supply of "Refrigerant 12" can be used hundreds of times, as pointed out above, and can be held in a cylindrical container 11 about 1 ½ inch in diameter and 5 inches long. A container having these dimensions is readily held in the hand, is easy to manipulate into and out of testing conditions, and is conveniently slipped into a clothing pocket for storage.

The use of compressed gases that are not liquefied, or the use of a liquid that does not effectively vaporize, may be accompanied by excessive pressure changes upstream of orifice 20. In such cases a pressure regulator can be provided in place of the vaporizing chamber. In general so long as the pressure upstream of the orifice is at least several times the pressure being measured, changes in that upstream pressure will not have any significant effect on the measuring. On the other hand liquefied gases provide gas at a fairly constant pressure without a regulator.

The construction of FIG. 1 can be used to measure nip pressures where the roll material at the nip is elastomeric such as of rubber, and yields significantly, or where the rolls are of steel and essentially non-yielding. The nip pressure is determined not only by the relative yieldability of the roll material but also by the force with which the rolls are squeezed together, but regardless of the roll construction the apparatus of the present invention can be used and will give highly reproducible results. Where the rolls are spaced from each other so that there is a clearance in the nip greater than twice the wall thickness of tube 30, accurate roll setting measurements with the illustrated apparatus will require substantial flow through the tube. For such purposes less restrictive orifices are needed to permit the pressure to build up in tube 30. The flow rate can be diminished by filling tube 30 or merely filling the portion of that tube at the nip, with a resilient compressible fluid transmitting porous plug such as a soft open-celled polyurethane foam. Such foam can be in the form of a cylindrical plug inserted in tube 30 so that it is compressed at the nip. Where the foam plug requires a substantial pressure to compress it, such pressure should be added to the pressure indicated by gauge 42 for the purpose of determining the nip pressure. Alternatively pressure gauge 42 can be calibrated so as to show the total pressure directly.

Instead of inserting a porous plug in tube 30, a non-porous plug such as a sheet of plastic or metal can be inserted into the tube to effectively increase its flattened thickness and thus use it with rolls spaced relatively far apart. Flattened tube 30 can even be folded double at the outer end and along a fold line running longitudinally of the tube, to increase its flattened thickness.

Tube 30 should have a wall strength that will withstand the maximum pressures measured, and where such pressures are very high the wall thickness can be made greater than 5 mils. Limp resins, such as low density polyethylene, plasticized polyvinylchloride and cellulose butyrate can be used in such thicknesses. Low density polyethylene has been found effective in 1 ½ mil wal thickness for measuring pressures up to 12 pounds per square inch, and in 3 mil wall thickness for pressures from 8 to 25 pounds per square inch.

Thick-walled tubes are preferably pre-creased where they fold into flattened condition, and even thin-walled tubes should be pre-creased there when measuring very low pressures. Otherwise the folded edges tend to pass fluid when the tube is otherwise squeezed shut.

The construction of FIG. 2 is similar to that of FIG. 1 but restricts the volume of fluid flow rather than the rate. In FIG. 2 the test apparatus 110 does not have the orifice 20 of FIG. 1, but has a single-shot dispenser can 113 containing the pressurized source of gas. The can has a dip tube 100 the top of which merges into a cup-shaped plug 101 crimped into the neck of the can. The can mouth is sealed by a washer 102 through which passes an actuator rod 103 that has its inner end 104 close to the discharge end of the dip tube 100. A flange 105 keeps the rod 103 from being expelled, and an exit bore 106 extends longitudinally through its outer end, emerging from the side of the rod at 107.

The location of bore end 107 is such that it is covered by washer 102 when the rod is in the illustrated position, but upon pushing the rod inwardly of the can mouth the rod end 104 first seats against and seals the discharge end of dip tube 100, and further inward movement of the rod then exposes bore end 107 to the chamber 108 between washer 102 and the dip tube top. This permits the discharge of the contents of that chamber only.

Release of the actuator rod 103 then causes the rod to move outwardly, first closing off the bore end 107 and then opening the discharge end of the dip tube. That discharge end is made somewhat yieldable so that it maintains a seal against rod end 104 while end 104 moves outwardly the short distance needed to move bore end 107 into sealed position within washer 102.

When the discharge end of the dip tube is opened by outward movement of actuator rod 103, chamber 108 which is then at substantially atmospheric pressure, receives another charge of material from the inner contents of the can and the can is ready for the next discharge.

The construction of FIG. 2 has a nip tube 130 similar to tube 30 of FIG. 1 but carrying an outer sleeve 131 and used with rolls 151, 152 that are spaced apart more than the overall thickness of flattened tube 130 alone. Sleeve 131 takes up this extra spacing so that the apparatus 110 can be used in a manner similar to the way apparatus 10 of FIG. 1 is used. The sleeved portion of tube 130 is inserted in the nip to be measured, and a single shot of fluid discharged from can 113 by pushing slide 114 forward. The volume of chamber 108 can be arranged to be such that it provides enough fluid for a single measurement. This calls for a slight excess over that required to pressurize the conduit from can to nip, to the necessary measuring pressure.

To protect the apparatus from pressure surges caused by such pressurizing, pressure gauge 142 can be built to withstand the maximum surge pressure or it can be provided with an orifice that restricts movement in branch 144, thus equalizing the surge. Also the chamber 108 can be arranged to provide only half the fluid needed for a measurement so that two operations of the slide 114 are needed and pressure surges are of smaller amplitude. Tube 130 should also be strong enough and secured tightly enough to withstand the surges.

It is not necessary to use the single-shot dispenser of FIG. 2 to limit the quantity of fluid supplied. Careful manipulation of the slide button 14 in the construction of FIG. 1 will also provide adequate control of fluid volume, particularly if the pressure gauge is protected against inadvertent discharges of excessive fluid. With such a modified technique the orifice 20 is not needed and can be opened up to the size of the main conduit.

Instead of having the measuring equipment of the present invention in the form shown in FIGS. 1 and 2, it can be made in the general shape of a pistol with the handle hollowed to receive the pressurized fluid and internally connected to the barrel portion of the piston. With this construction the pressure gauge can conveniently be made of the relatively flat edge-reading type so that it can be mounted in or on an enlargement of the barrel, with its calibrated edge facing to the rear of the piston.

It will be noted that in the constructions of the drawings the interior space in containers 11 and 111 are not under pressure. As explained above, gasket 19 keeps the test fluid from entering that space so that there is no material danger of having the container explode nor for that matter does the container have to be built ruggedly to withstand any significant pressure. The container can have a screw-together construction as shown at 23, without being concerned that internal pressure build-up may make it difficult to unscrew. Gasket 19 should be quite yieldable to permit the can movement needed to operate its valve and still maintain a good seal. However the apparatus can be used with this gasket arranged to seal only when the can is pushed forward and the can valve opened. In such a construction the pressure in tube 30 will not be maintained when button 14 is retracted, but will gradually drop because of leakage backward through orifice 20. Gasket 102 can be arranged to provide the yieldable sealing operation as described above.

The apparatus of the present invention can also use as sources of fluid the prior art type of pressure containers having a built-in dip tube. Such a container is illustrated in FIG. 3 at 213 and has a nozzle outlet 260 containing two concentric tubes 261 and 262. Tube 261 is a conventional discharge outlet, but tube 262 projects entirely through the can and emerges at the other end as indicated at 263. Can 213 is conventionally used by having the can inserted into a supply of material to be sprayed, with tube end 263 serving as a dip tube. Accordingly when nozzle 260 is pushed inwardly, fluid is propelled under pressure out through tube 261 and aspirates the material to be sprayed up through tube 262.

According to the present invention can 213 can be substituted for can 13 in the construction of FIG. 1 by fitting a deflecting cap 270 over nozzle 260 to cause the discharging pressurized fluid to enter tube 262 at the nozzle end and emerge from end 263. At the same time end 263 which is usually longer, is cut off to fit within the configuration of container 11 and the can end around it is provided with gasket 219. Can 213 can then be slipped into container 11 and securely held in place, leaving the slide button 14 to engage cap 270 and in this way actuate the discharge valve. In this arrangement fluid is released from can 213 while the can is perfectly stationary so that gasket 219 does not have to allow for can movement.

Instead of using portable containers of pressurized fluids, such fluids can alternatively be obtained from a fixed reservoir or a piped supply. Thus in some instances compressed air is piped to various locations in printing plants and a compressed air line is conveniently located near a printing press. It is then only necessary to connect the upstream end of fitting 20 directly to such a compressed air line, preferably using a rubber or similarly flexible air hose to make such a connection and providing an on-off control for that connection. Container 12 is then not needed, and measurements can be made at any place the air hose connection will permit reaching. Air pressures of 15 to 200 pounds per square inch can be used for measuring nip pressures up to 90 percent of the air pressures. "Refrigerant 22," which is $CHClF_2$, also enables measurement of very high pressures and can be used at very low temperatures, substantially lower than "Refrigerant 12" which is $CCl_2F_2$ and is less volatile. Other refrigerants can also be used but noxious refrigerants like ammonia and $SO_2$ are best avoided.

The use of only a small discharge quantity of fluid for a measurement is desirable. Each discharge produces a cooling effect by reason of the expansion that takes place as the fluid experiences a pressure reduction. Such cooling of only a second or two duration is insignificant, particularly where a few more seconds elapse before the next cooling effect. It is especially helpful to make fitting 20 and container 12 of high thermal conductivity metal such as aluminum so that the hand holding the container warms it up and offsets the cooling effects of the fluid expansion.

The maximum pressures available from liquefied gases will vary with the ambient temperature and with the warming effect of the hand that holds the measuring unit. However it is preferred to use liquefied gases whose pressures substantially exceed the pressures to be measured so that ambient and hand-warming temperature changes become immaterial.

The pressure measuring of the present invention can also be used on textile rolls, paper-making rolls, laminating rolls such as those used in making plywood, embossing rolls and the like.

Obviously many modifications and variations of the present invention are possible in the light of the above teachings. It is, therefore, to be understood that within the scope of the appended claims the invention may be practiced otherwise than as specifically described.

What is claimed:

1. The process for measuring the pressure exerted at the nip of a roll, which process comprises passing a restricted flow of pressurized fluid through a thin-walled non-rigid tube extending into the nip, and measuring the pressure in the tube when it is balanced by the nip pressure.

2. The process of claim 1 in which the flow of pressurized fluid is restricted as to rate of flow so as not to exceed the rate of flow permitted by the nip.

3. The process of claim 2 in which the flow of pressurized fluid is restricted by an orifice.

4. The process of claim 1 in which the flow of pressurized fluid is restricted as to quantity flowed so as not to subject the tube to damaging pressure.

5. The process of claim 3 in which the fluid is supplied to the tube from a single-shot dispenser.

6. The combination of claim 1 in which the tube has a wall thickness at least half the nip clearance.

7. The combination of claim 1 in which the fluid is a refrigerant gas.

8. The combination of claim 1 in which the nip is elastomeric.

9. The combination of claim 1 in which the wall thickness of the tube is less than half the nip clearance and the tube is plugged at the nip with a resiliently compressible fluid-transmitting porous plug.

10. The combination of claim 1 in which the wall thickness of the tube is less than half the nip clearance and a filler is inserted into the nip with the tube to take up residual nip clearance.

11. A pressure measuring device having means for supplying a restricted stream of fluid under pressure, a conduit connected for receiving the stream, said conduit terminating with a thin-walled non-rigid tube, and a pressure gauge connected to the conduit at a location between the supply means and the non-rigid tube, the thin-walled non-rigid tube being removably connected to the balance of the conduit by a pressure-withstanding connection that includes an O-ring groove encircling a portion of the conduit, an O-ring in the groove and projecting therefrom, the tube being fitted over the O-ring, and a locking ring encircling the tube over the O-ring and having an internal groove that receives the tube-covered outer portion of the O-ring and seals the connection.

12. The combination of claim 11 in which the locking ring is of bulbous shape to keep it from being drawn into the nip of rolls.

13. The combination of claim 12 in which the surface of the locking ring is resinous.

14. The combination of claim 13 in which the resinous surface is at least as low-friction as polyethylene.

15. A pressure measuring device having means for supplying a restricted stream of fluid under pressure, a conduit connected for receiving the stream, said conduit terminating with a thin-walled non-rigid tube plugged with a resiliently compressible fluid-transmitting porous plug, and a pressure gauge connected to the conduit at a location between the supply means and the non-rigid tube.

16. A pressure measuring device having single-shot dispenser means for supplying a restricted stream of fluid under pressure, a conduit connected for receiving the stream, said conduit terminating with a thin-walled non-rigid tube, and a pressure gauge connected to the conduit at a location between the dispenser means and the non-rigid tube.

17. A device for measuring the pressure in a roller nip, the device having a thin-walled, non-rigid, readily deformable tube one end of which is effectively open and is exposed for insertion into the nip, a conduit connecting the other end of the tube to a source of fluid under pressure, means for restricting the flow of fluid from said source to the tube, and a pressure gauge connected to the conduit at a location downstream of the restricting means to indicate the pressure of the fluid in the tube when that pressure balances the nip pressure.

18. The combination of claim 17 in which the conduit includes a readily bendable bend-retaining section that enables the tube to be inserted into a nip by bending the bendable section so that the apparatus can be held in a location convenient to the nip.

19. The combination of claim 17 in which the apparatus including its source of fluid is entirely portable and hand-held.

20. The combination of claim 17 in which the apparatus includes as a source of fluid under pressure, a container of pressurized gas.

21. The combination of claim 17 in which the tube is a limp one.

22. The combination of claim 17 in which the restricting means an orifice.

* * * * *